US006285383B1

United States Patent
Klement et al.

(10) Patent No.: US 6,285,383 B1
(45) Date of Patent: Sep. 4, 2001

(54) METHOD OF CONTROLLING LASER SCANNER PHASE IN A MULTICOLOR ELECTROPHOTOGRAPHIC MACHINE

(75) Inventors: Martin Christopher Klement; Gregory Lawrence Ream; John Parker Richey, all of Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 09/662,380

(22) Filed: Sep. 14, 2000

(51) Int. Cl.$^7$ .......................... G03G 15/01; G02B 26/10
(52) U.S. Cl. .............................. 347/116; 347/234
(58) Field of Search ...................................... 347/116, 234, 347/235, 248, 249, 250; 399/299, 301

(56) References Cited

U.S. PATENT DOCUMENTS

| | | |
|---|---|---|
| 4,130,838 | 12/1978 | St. John . |
| 4,140,903 | 2/1979 | Clark . |
| 4,845,358 | 7/1989 | Asada . |
| 4,922,266 | 5/1990 | Bidner et al. . |
| 4,931,815 | 6/1990 | Sato et al. . |
| 4,951,065 | 8/1990 | Okino . |
| 4,975,626 | 12/1990 | Yagi et al. . |
| 5,054,866 | 10/1991 | Tomita et al. . |
| 5,105,208 | 4/1992 | Matsuoka et al. . |
| 5,121,138 | 6/1992 | Schermer et al. . |
| 5,181,137 | 1/1993 | Koide . |

(List continued on next page.)

FOREIGN PATENT DOCUMENTS 9-106129 * 4/1997 (JP) .
11-218696 * 8/1999 (JP) .

Primary Examiner—Joan Pendegrass
(74) Attorney, Agent, or Firm—Taylor & Aust, P.C.

(57) ABSTRACT

A method of aligning print images of an electrophotographic machine on a print medium includes reflecting a first laser beam off of a first rotating reflector to thereby scan the first laser beam across a first photoconductive drum to produce a first scan line in a scan direction. The rotation of the first reflector is cyclically repeated to thereby produce a plurality of substantially parallel first scan lines on the first photoconductive drum. A respective line of first toner is applied to each of the first scan lines. A second laser beam is reflected off of a second rotating reflector to thereby scan the second laser beam across a second photoconductive drum to produce a second scan line in the scan direction. The rotation of the second reflector is cyclically repeated to thereby produce a plurality of substantially parallel second scan lines on the second photoconductive drum. A respective line of second toner is applied to each of the second scan lines. A moving toner transfer medium contacts each of the first photoconductive drum and the second photoconductive drum. Each line of first toner is transferred from the first photoconductive drum to the toner transfer medium. Each line of second toner is transferred from the second photoconductive drum to the toner transfer medium such that the lines of second toner are substantially interspersed with the lines of first toner on the toner transfer medium. The lines of first toner and the lines of second toner are transferred from the toner transfer medium to the print medium. A desired phase difference between the rotation of the first reflector and the rotation of the second reflector is determined. The desired phase difference is such that at least one line of first toner is substantially aligned in a process direction with a corresponding line of second toner on the toner transfer medium. The process direction is substantially perpendicular to the scan direction. A speed of the rotation of the first reflector and/or the second reflector is temporarily changed to thereby achieve the desired phase difference therebetween.

24 Claims, 8 Drawing Sheets

U.S. PATENT DOCUMENTS

| | | |
|---|---|---|
| 5,212,570 | 5/1993 | Nacman . |
| 5,245,637 | 9/1993 | Gersbach et al. . |
| 5,260,811 | 11/1993 | Morikawa . |
| 5,331,341 | 7/1994 | Egawa et al. . |
| 5,331,342 | 7/1994 | Shimatani et al. . |
| 5,349,374 | 9/1994 | Arai et al. . |
| 5,424,763 | 6/1995 | Komiya et al. . |
| 5,448,267 | 9/1995 | Sugiura et al. . |
| 5,471,314 | 11/1995 | Orlicki et al. . |
| 5,477,330 | 12/1995 | Dorr . |
| 5,541,637 | 7/1996 | Ohashi et al. . |
| 5,550,573 | 8/1996 | Serizawa et al. . |
| 5,671,069 | 9/1997 | Kodama . |
| 5,710,751 | 1/1998 | Hoover et al. . |
| 5,764,270 | 6/1998 | Kitigawa et al. . |
| 5,818,507 | 10/1998 | Genovese . |
| 5,821,977 | 10/1998 | Nishimura . |
| 5,877,798 | 3/1999 | Clarke et al. . |
| 5,883,659 | 3/1999 | Serizawa et al. . |
| 5,933,184 | 8/1999 | Ishigami et al. . |
| 5,982,408 | 11/1999 | Overall et al. . |
| 6,052,143 | 4/2000 | Yoshino et al. . |
| 6,094,208 | 7/2000 | Oda et al. . |
| 6,160,566 * | 12/2000 | Maeda .................................. 347/234 |

\* cited by examiner

METHOD OF CONTROLLING LASER SCANNER PHASE IN A MULTICOLOR ELECTROPHOTOGRAPHIC MACHINE

BACKGROUND OF THE INVENTION

1. Field of the Invention

The present invention relates to a method of controlling print registration in an electrophotographic machine, and, more particularly, to a method of controlling laser scanner phase in a multicolor electrophotographic machine.

2. Description of the Related Art

In an in-line color laser image printing process, the print medium typically passes through four color developing stations in series, with the colors being black, magenta, cyan and yellow. In order for the multi-color laser printer to print at the same speed as a monochrome laser printer, photoconductive drum exposures must occur for all four colors simultaneously. The color planes must be properly registered with each other for proper rendering of images without undesirable color shifts and artifacts.

Pipeline color printers which image using laser print heads are limited by the granular one picture element separation between successive scan lines. Without a method of controlling the phase relationship between multiple laser scanners, color planes would be randomly shifted relative to each other by a distance between zero and the width of a picture element, thereby creating color shifts. Thus, alignment of the four color developing stations in both the process direction (feed direction of the print medium) and scan direction (across the page) is critical.

The process location of each scanning laser beam must overlap in order to prevent color offset in the process direction. Each color must have an adjustment to correct for process direction misalignment because each color has a scanning laser beam following a separate optical path. Without such adjustments, after a scan line is transferred from a first photoconductive drum to the transfer belt, and that point on the transfer belt is rotated to a second photoconductive drum, the scan line on the transfer belt from the first photoconductive drum will not align in the process direction with a scan line to be transferred from the second photoconductive drum.

What is needed in the art is a method of aligning scan lines of multiple photoconductive drums in a process direction in order to avoid undesirable color shifts and print artifacts.

SUMMARY OF THE INVENTION

The present invention provides a method of precisely controlling the relative phase between multiple laser scanners so that color planes can be registered to within a fraction of the width of a picture element in the process direction.

The invention comprises, in one form thereof, a method of aligning print images of an electrophotographic machine on a print medium. A first laser beam is reflected off of a first rotating reflector to thereby scan the first laser beam across a first photoconductive drum to produce a first scan line in a scan direction. The rotation of the first reflector is cyclically repeated to thereby produce a plurality of substantially parallel first scan lines on the first photoconductive drum. A respective line of first toner is applied to each of the first scan lines. A second laser beam is reflected off of a second rotating reflector to thereby scan the second laser beam across a second photoconductive drum to produce a second scan line in the scan direction. The rotation of the second reflector is cyclically repeated to thereby produce a plurality of substantially parallel second scan lines on the second photoconductive drum. A respective line of second toner is applied to each of the second scan lines. A moving toner transfer medium contacts each of the first photoconductive drum and the second photoconductive drum. Each line of first toner is transferred from the first photoconductive drum to the toner transfer medium. Each line of second toner is transferred from the second photoconductive drum to the toner transfer medium such that the lines of second toner are substantially interspersed with the lines of first toner on the toner transfer medium. The lines of first toner and the lines of second toner are transferred from the toner transfer medium to the print medium. A desired phase difference between the rotation of the first reflector and the rotation of the second reflector is determined. The desired phase difference is such that at least one line of first toner is substantially aligned in a process direction with a corresponding line of second toner on the toner transfer medium. The process direction is substantially perpendicular to the scan direction. A speed of the rotation of the first reflector and/or the second reflector is temporarily changed to thereby achieve the desired phase difference therebetween.

An advantage of the present invention is that the laser beams of a multicolor electrophotograhpic machine can be aligned in the process direction in real time while the machine is operating.

Another advantage is that the relative phase between two rotating polygon mirrors which scan the laser beams can be set and maintained or readjusted in response to a sensed misregistration signal.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
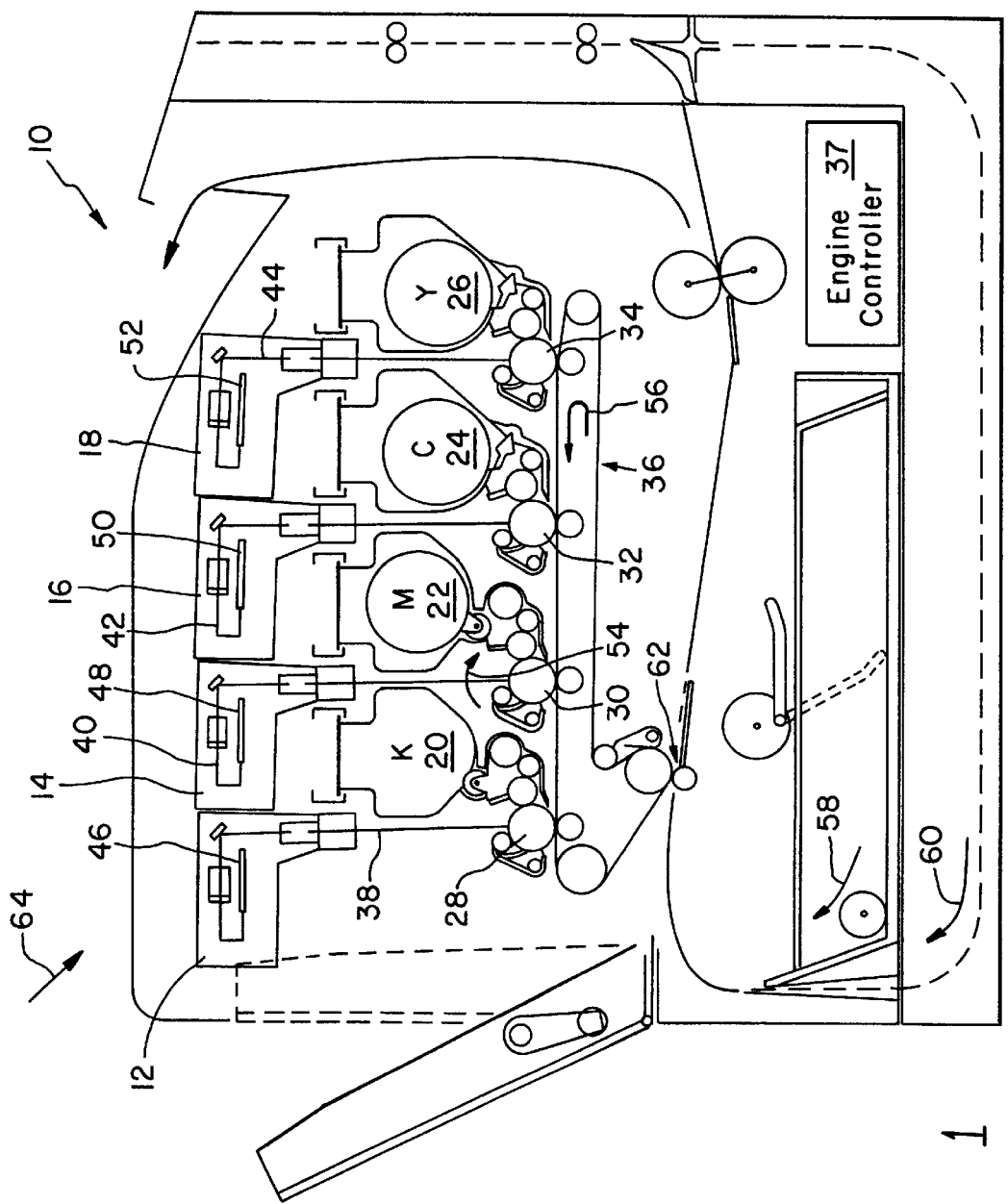
FIG. 1 is a side, sectional view of one embodiment of a multicolor laser printer in which the method of the present invention may be used.

Referring now to the drawings and, more particularly, to FIG. 1, there is shown one embodiment of a multicolor laser printer 10 including laser print heads 12, 14, 16, 18, a black toner cartridge 20, a magenta toner cartridge 22, a cyan toner cartridge 24, a yellow toner cartridge 26, photoconductive drums 28, 30, 32, 34, an intermediate transfer member belt 36 and an engine controller 37.

Each of laser print heads 12, 14, 16 and 18 projects a respective laser beam 38, 40, 42, 44 off of a respective one of polygon mirrors 46, 48, 50 and 52. As each of polygon mirrors 46, 48, 50 and 52 rotates, it scans a respective one of reflected laser beams 38, 40, 42 and 44 in a scan direction, perpendicular to the plane of FIG. 1, across a respective one of photoconductive drums 28, 30, 32 and 34. Each of photoconductive drums 28, 30, 32 and 34 is negatively charged to approximately −950 volts and is subsequently discharged to a level of approximately −250 volts in the areas of its peripheral surface that are impinged by a respective one of laser beams 38, 40, 42 and 44. During each scan of a laser beam across a photoconductive drum, each of photoconductive drums 28, 30, 32 and 34 is continuously rotated, clockwise in the embodiment shown, in a process direction indicated by direction arrow 54. The scanning of laser beams 38, 40, 42 and 44 across the peripheral surfaces of the photoconductive drums is cyclically repeated, thereby discharging the areas of the peripheral surfaces on which the laser beams impinge.

The toner in each of toner cartridges 20, 22, 24 and 26 is negatively charged and is transported as a thin, uniform layer on the surface of a developer roll with a core potential of approximately −600 volts. Thus, when the toner from cartridges 20, 22, 24 and 26 is brought into contact with a respective one of photoconductive drums 28, 30, 32 and 34, the toner is attracted to and adheres to the portions of the peripheral surfaces of the drums that have been discharged to −250 volts by the laser beams. As belt 36 rotates in the direction indicated by arrow 56, the toner from each of drums 28, 30, 32 and 34 is transferred to the outside surface of belt 36. As a print medium, such as paper, travels along either path 58 or duplexing path 60, the toner is transferred to the surface of the print medium in nip 62.

Printheads 12, 14, 16, 18 are structurally substantially identical. Accordingly, to simplify the discussion and for ease of understanding the invention, only the structure of printhead 12 will be described in detail below in relation to FIGS. 2–4. However, it is to be understood that the discussion that follows with respect to printhead 12 also applies to each of printheads 14, 16 and 18.

Figure 2:
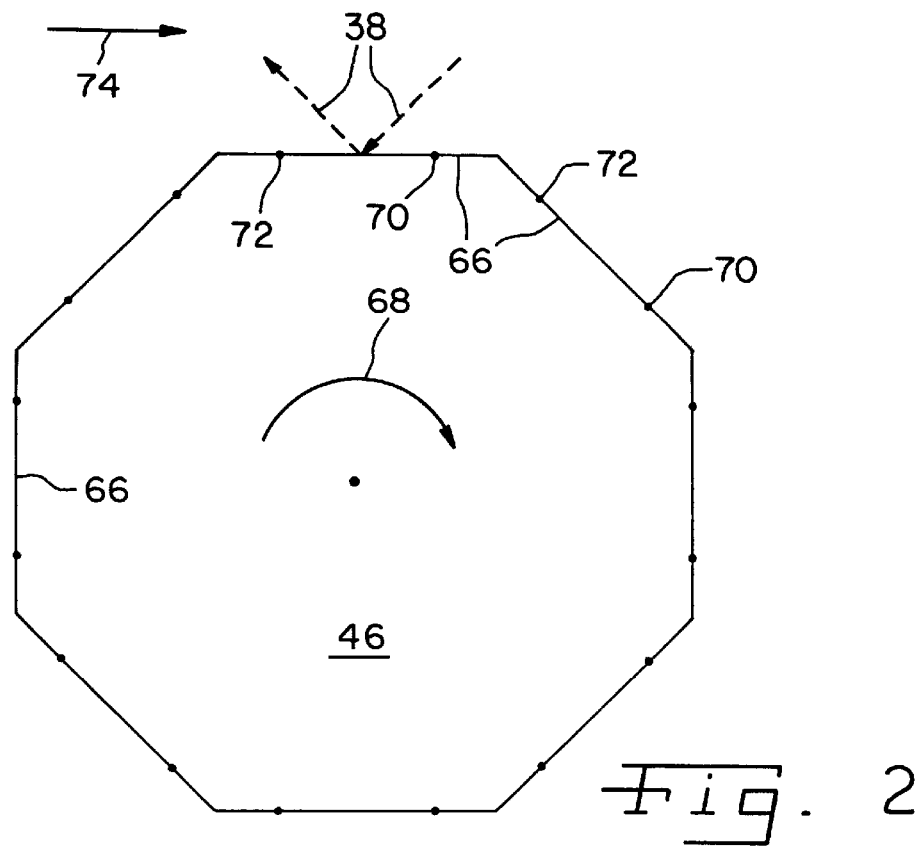
FIG. 2 is a cross-sectional view of one of the polygon mirrors of FIG. 1 reflecting a laser beam.

One embodiment of a polygon mirror 46 is show in FIG. 2 as viewed in the direction of arrow 64 in FIG. 1. Polygon mirror 46 is shaped as an octagon with eight reflective sides or facets 66. As polygon mirror 46 rotates in the direction indicated by arrow 68, laser beam 38 reflects off of facets 66 between points 70 and 72 toward photoconductive drum 28. Thus, as polygon mirror 46 rotates in direction 68, the reflected laser beam 38 is caused to scan across the peripheral surface of photoconductive drum 28 in scan direction 74.

Figure 3:
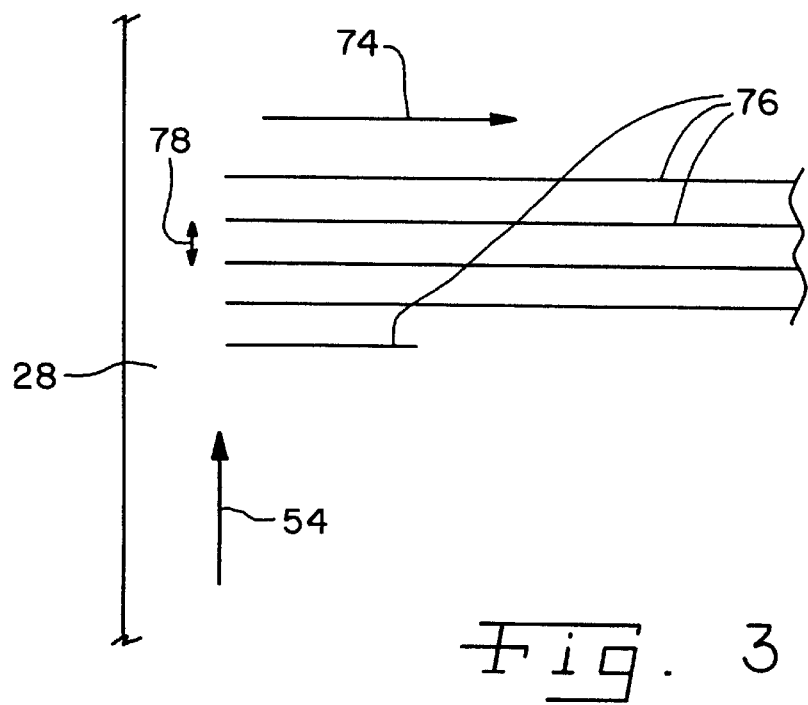
FIG. 3 is a fragmentary, top view of one of the photoconductive drums of FIG. 1.
Figure 4:
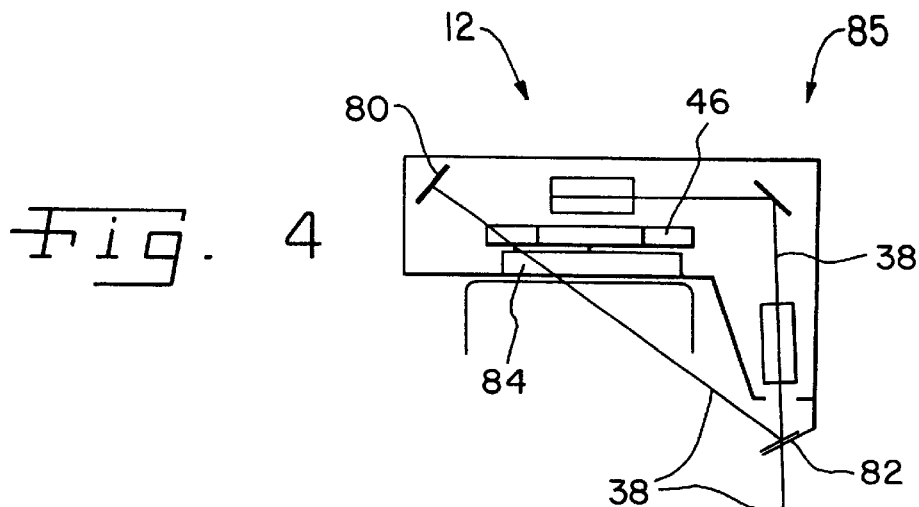
FIG. 4 is an enlarged, schematic side view of one of the laser printheads of FIG. 1 and the corresponding photoconductive drum.

Laser beam 38 produces a respective one of scan lines 76 (FIG. 3) each time that mirror 46 rotates such that laser beam 38 is reflected continuously between points 70 and 72 on one of facets 66. The bottom scan line 76 of FIG. 3 is shown in an uncompleted state, as it would be with laser beam 38 reflecting off of one of facets 66 at a point approximately midway between points 70 and 72, as shown in FIG. 2. The reflection of laser beam 38 off of polygon mirror 46 is temporarily interrupted in the time period after laser beam reaches point 72 and before polygon mirror 46 has rotated to a point at which laser beam 38 can reflect off of point 70 on the next succeeding facet 66. Once outside the image area that corresponds to the scan generated between points 70 and 72, the laser beam is temporarily enabled to produce start of scan, end of scan, or both synchronization signals as the laser beam strikes sensors positioned outside the image area. The pulse generated when the laser beam strikes the synchronization sensor is termed HSYNC. Due to the continual rotation of photoconductive drum 28 in process direction 54, the scan lines 76 associated with adjacent facets 66 are displaced from one another by a constant scan line separation distance 78 in process direction 54. The length of scan line separation distance 78 relative to the width of each individual scan line 76 is greatly exaggerated in FIG. 3 for purposes of clarity of illustration.

A different image is scanned on each of photoconductive drums 28, 30, 32 and 34, with each image depending on what combination of black, magenta cyan and yellow toner is to be deposited at each corresponding location on the print medium. In order to maintain proper registration, the images must be properly aligned in both process direction 54 and scan direction 74.

Printhead 12 (FIG. 4) includes a start-of-scan sensor 80, which is a position sensitive detector for detecting scanning laser beam 38 at the start-of-scan. Start-of-scan sensor 80 can have both scan direction 74 and cross-scan direction 54 signal outputs. Alternatively, start-of-scan sensor 80 can have only a scan direction 74 signal output. Start-of-scan sensor 80 is positioned to receive scanning laser beam 38 following reflection from a start-of-scan mirror 82. A motor 84 rotates polygon mirror 46 in direction 68. Mirror 46, motor 84, and associated mirrors and lenses together form a laser scanner 85.

At the start of a scan, when laser beam 38 impinges upon start-of-scan sensor 80 immediately before impinging upon photoconductive drum 28, a horizontal synchronization signal (HSYNC) is generated by sensor 80. A horizontal synchronization signal is generated each time laser beam 38 begins to impinge upon the next succeeding facet 66.

Figure 5:
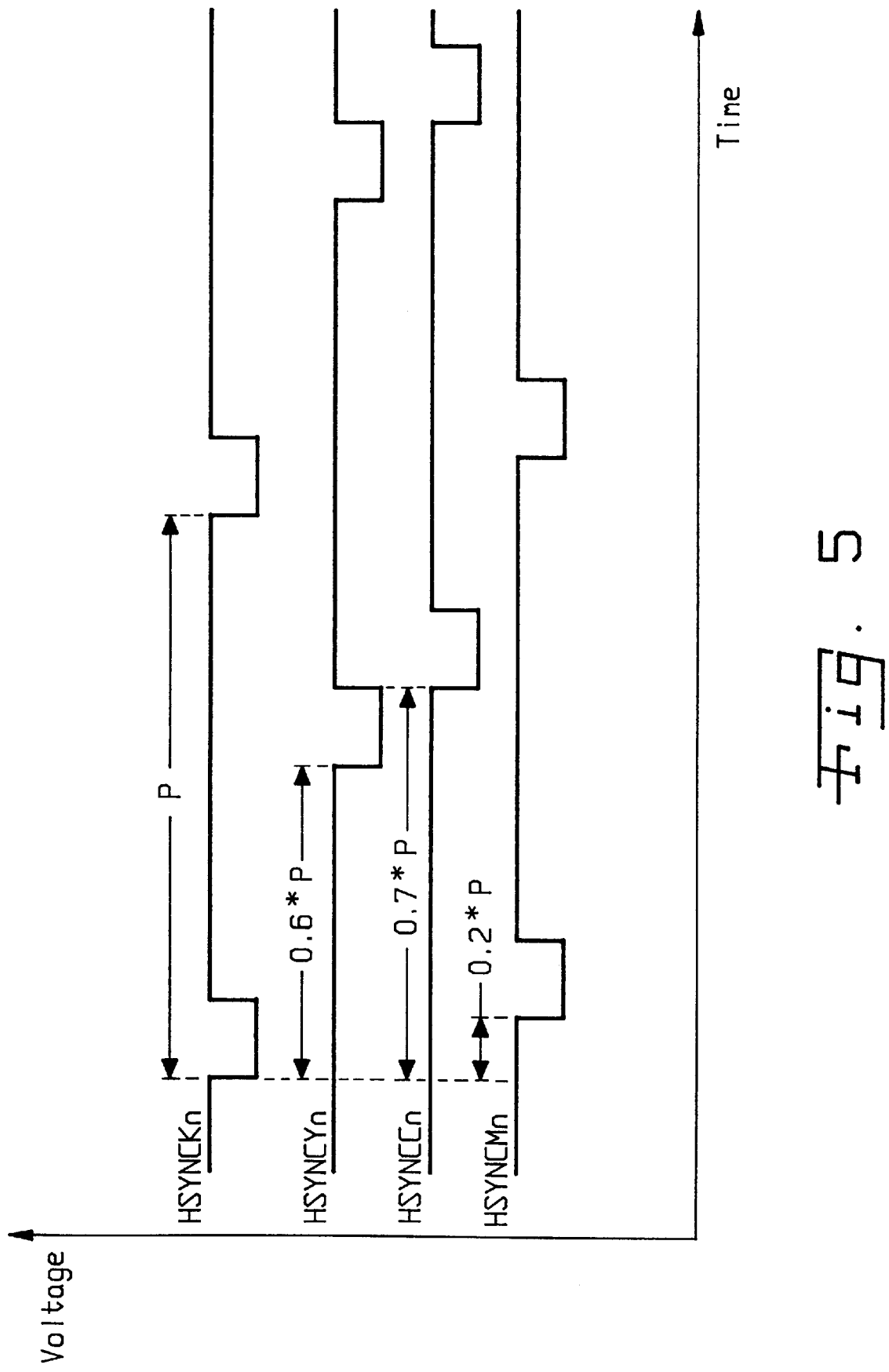
FIG. 5 is a timing diagram of several signals transmitted by sensors within the printheads of FIG. 1.

Besides indicating the beginning of light impinging on photoconductive drums 28, 30, 32, 34, the horizontal synchronization signals can also be used to align images in process direction 54 if the horizontal synchronization signals are properly staggered in time, as shown in FIG. 5. FIG. 5 illustrates the horizontal synchronization signals corresponding to polygon mirrors 46, 48, 50 and 52. FIG. 5 is not intended as a plot of the horizontal synchronization signals, but rather is merely a timing diagram to indicate the phase relationship between the signals. That is, no particular relationship between the voltage magnitudes of the horizontal synchronization signals is intended to be derivable from FIG. 5. As can be seen, the period of each of the horizontal synchronization signals is nominally the same, indicating that each of polygon mirrors 46, 48, 50 and 52, and their corresponding motors, rotate at substantially equal speeds. The time staggering between the horizontal synchronization signals indicates a corresponding staggering of the times at which the corresponding laser beams 38, 40, 42 and 44 start a scan line. A delay in one horizontal synchronization signal relative to another horizontal synchronization signal is indicative of a corresponding delay in the time at which the corresponding laser beam starts a scan line relative to the time at which the other corresponding laser beam starts a scan line.

Figure 6:
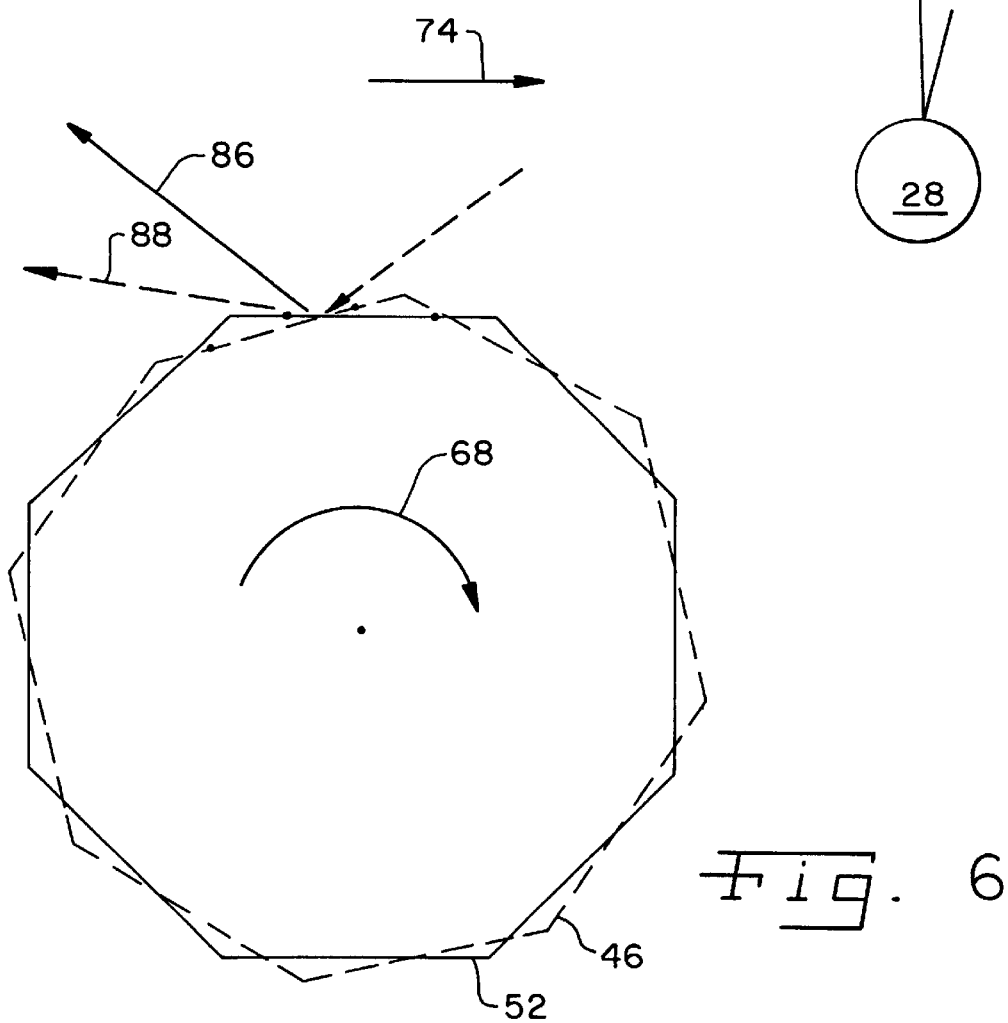
FIG. 6 is a cross-sectional, superimposed view of two of the polygon mirrors of FIG. 1 reflecting respective laser beams.

A comparison of the rotational positions of polygon mirrors 46 and 52 at a particular point in time with HSYNCY spaced from HSYNCK by approximately 0.6 scan periods is shown in FIG. 6. The rotational position of polygon mirror 52 is indicated by solid lines, while the position of polygon mirror 46 is indicated by dashed lines. The rotational position of polygon mirror 52 is offset from the rotational position of polygon mirror 46 by 60% of one-eighth of a full rotation of an eight-sided polygon mirror. That is, mirrors 46 and 52 are offset from one another by 3/40 or 7.5% of a full rotation of a polygon mirror. Further, the position of laser beam 44 after being reflected off of mirror 52 is indicated by arrow 86, while the position of laser beam 38 after being reflected off of mirror 46 is indicated by arrow 88.

The proper amount of stagger between polygon mirrors 46 and 52 which results in each scan line of K falling exactly on a corresponding scan line of Y can be empirically determined. That is, a difference in the rotational positions of polygon mirrors 46 and 52 that results in the first scan line of K being aligned with the first scan line of Y in process direction 54 can be predetermined after manufacture of the particular printer 10. Alternatively, it is possible for the proper rotational stagger between polygon mirrors 46 and 52 to be determined during operation of printer 10. Further, the required amount of rotational stagger between each one of polygon mirrors 46, 48, 50, 52 and the remaining three other ones of polygon mirrors 46, 48, 50, 52 must also be predetermined and then physically realized.

In order to align the images produced by two polygon mirrors, a proper time difference or phase difference must be established between their horizontal synchronization signals. The method of the present invention controls the time or phase difference between the horizontal synchronization signals of two polygon mirrors. Two such polygon mirrors can be referred to as a "reference polygon" and a "target polygon", respectively, and can be embodied by any two of polygon mirrors 46, 48, 50 and 52.

Figure 7:
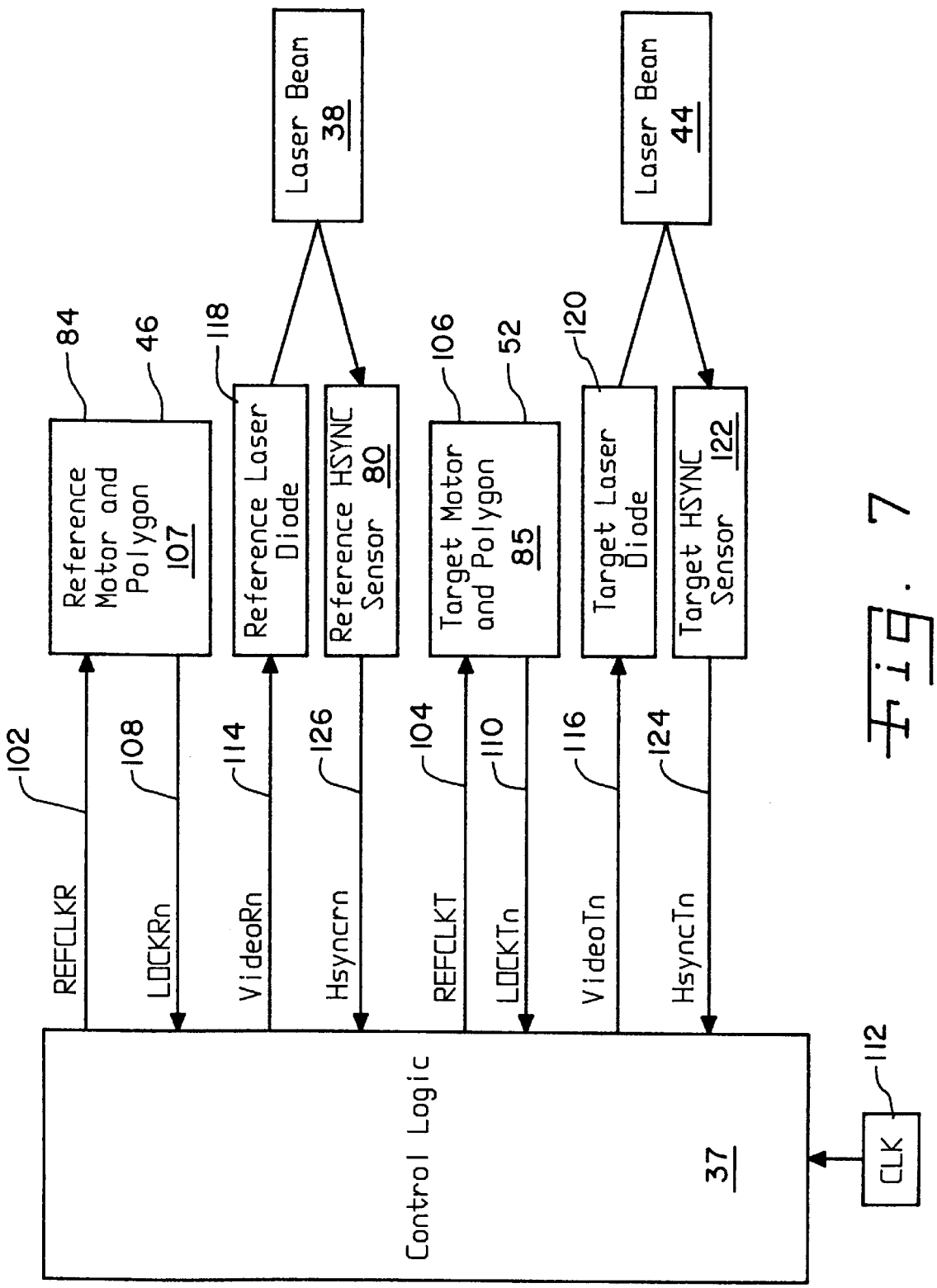
FIG. 7 is a block diagram of the operation of one embodiment of the method of the present invention.

The speed of motor 84, which drives polygon mirror 46, is proportional to the frequency of a digital clock signal sent to the motor driver. Since the other polygon mirrors 48, 50 and 52 are also driven by respective motors whose speed is determined by respective digital clock signals, the phase differences between polygon mirrors 46, 48, 50 and 52 can be controlled digitally through the digital clock signals. Such clock signals are referred to as "REFCLKR" and "REFCLKT" in the block diagram of FIG. 7, and are sent by engine controller 37 to a reference polygon and a target polygon, respectively, on signal paths 102 and 104, respectively. In FIG. 7, polygon mirror 46 and an associated driving motor 84 are considered the "reference motor and polygon" which together form laser scanner 107, while polygon mirror 52 and motor 106 are considered the "target motor and polygon" which together form laser scanner 85. However, it is to be understood that it is possible to treat any one of polygon mirrors 46, 48, 50 and 52 as the "reference polygon" and any remaining one as the "target polygon".

Confirmation that the reference motor and target motor are in phase lock with their corresponding reference clocks REFCLKR and REFCLKT is provided by feedback signals LOCKRn and LOCKTn, respectively, which are sent to engine controller 37 on signal paths 108 and 110, respectively. These feedback signals are provided as an output from the motor controllers associated with driving motors 84 and 106 that drive reference polygon 46 and target polygon 52, respectively. An F/G encoder is typically the source of the motor speed feedback signal for phase comparison to the reference clock.

Figure 8:
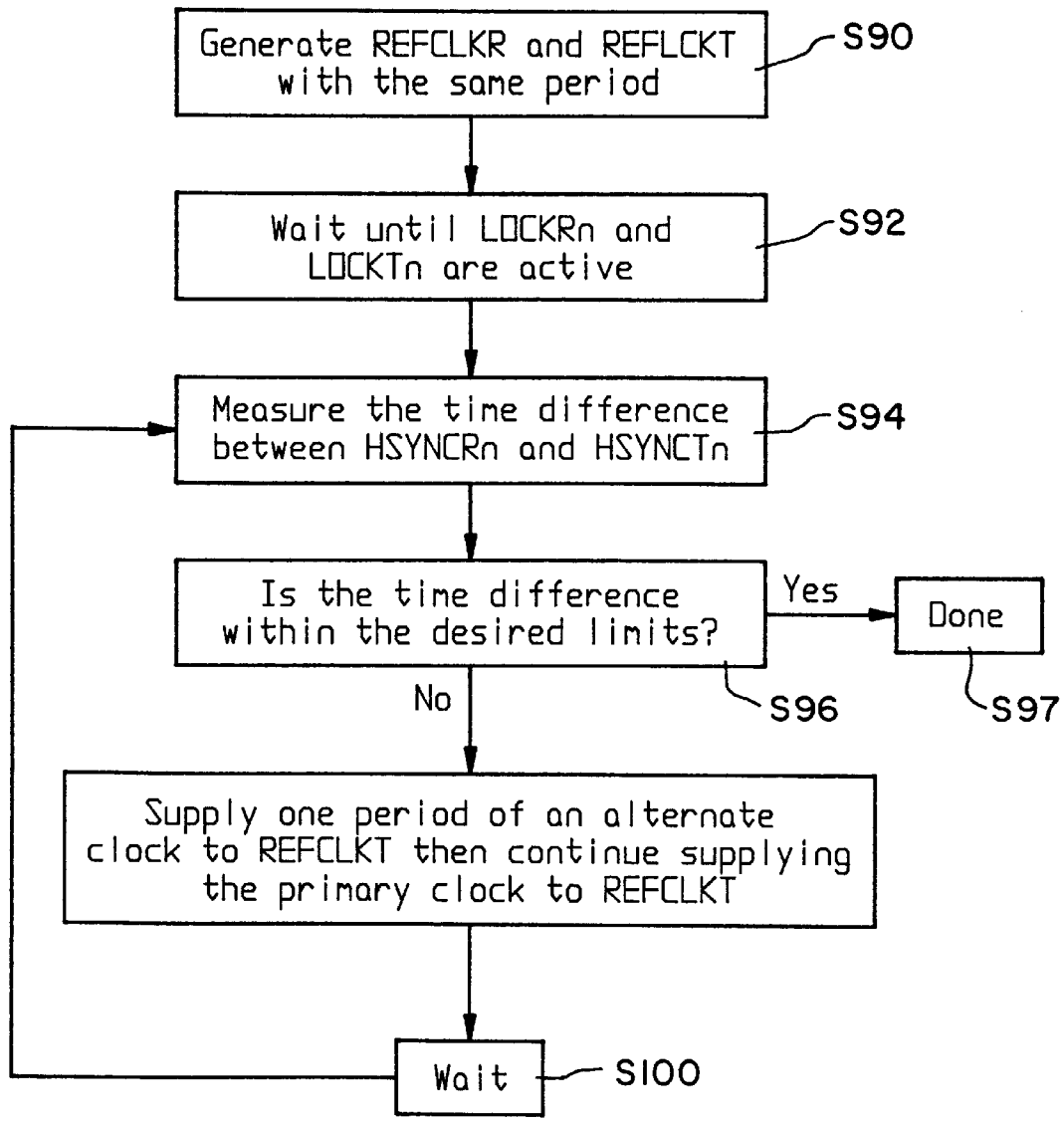
FIG. 8 is a flow chart illustrating the method of FIG. 7.
Figure 9:
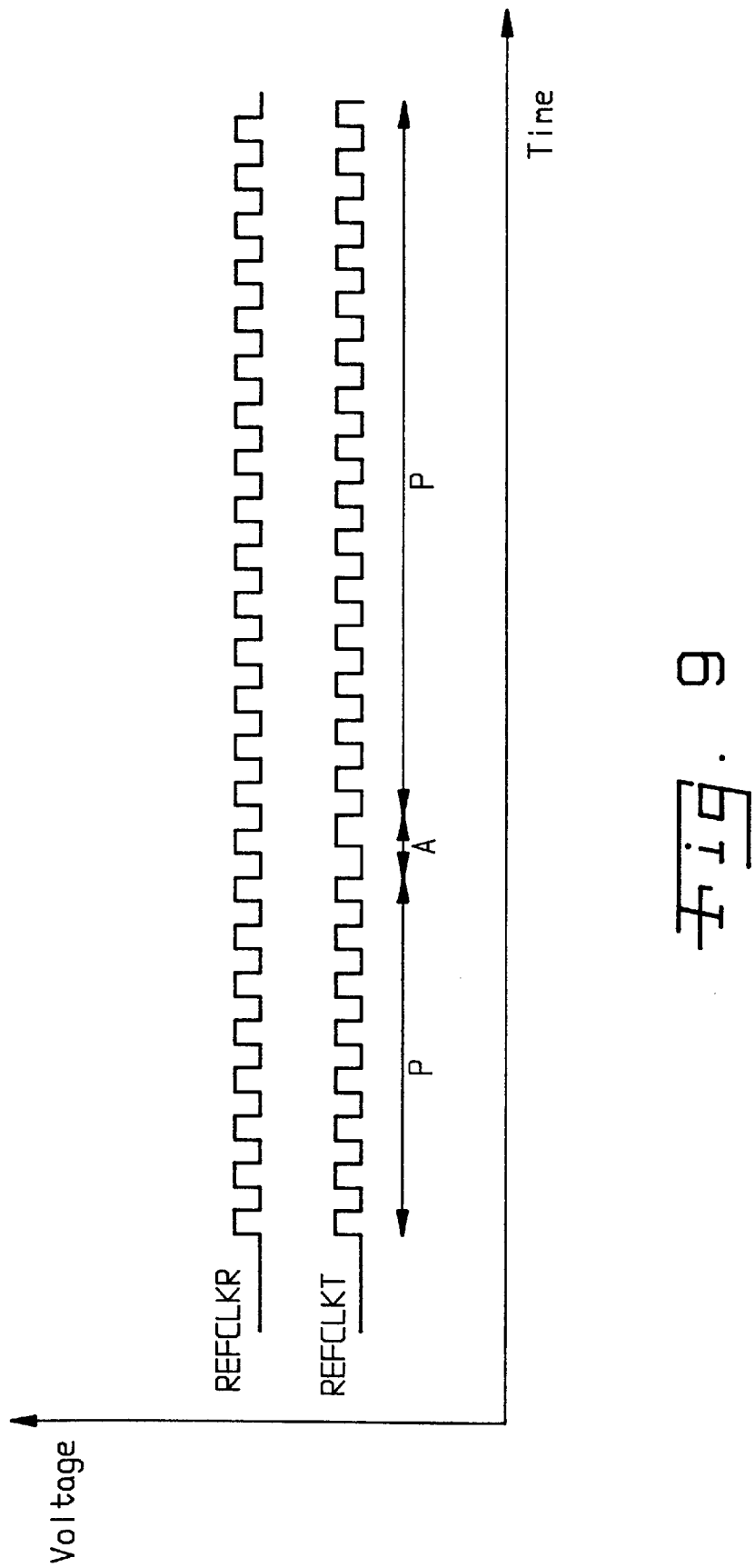
FIG. 9 is a timing diagram of two signals generated by the engine controller of FIG. 1.

FIG. 8 is a flow chart illustrating one embodiment of the method of the present invention. In step S90, clock signals REFCLKR and REFCLKT are generated such that the signals have the same frequencies and periods, as shown in the first time period P of FIG. 9. FIG. 9, similarly to FIG. 5, is not intended as a plot of clock signals REFCLKR and REFCLKT, but rather is merely a timing diagram to indicate the phase relationship between the signals. That is, no particular relationship between the voltage magnitudes of REFCLKR and REFCLKT is intended to be derivable from FIG. 9.

Clock signal REFCLKR is always driven with a primary clock having a fixed frequency. Clock signal REFCLKT is also driven with the primary clock during time periods P in FIG. 9. For reasons explained below, clock signal REFCLKT is driven with an alternate clock, having a different period and frequency than the primary clock, during time period A. The periods of the primary clock and the alternate clock are integer multiples of the period of a higher frequency clock source 112 (FIG. 7). The frequency of clock source 112 can be greater than 1 MHz.

In step S92, engine controller 37 waits until feedback signals LOCKRn and LOCKTn become active and verifies that reference motor 106 and target motor 84 are running at the desired speeds. Engine controller 37 transmits driving signals VideoRn and VideoTn on signal paths 114 and 116, respectively, to a reference laser diode 118 and a target laser diode 120, respectively, thereby modulating the respective laser beams 38 and 44 being reflected by the reference polygon 46 and the target polygon 52. After laser beams 38, 44 impinge upon and cross respective horizontal synchronization sensors 80 and 122, respective horizontal synchronization signals on signal paths 124, 126 are received by engine controller 37, which then measures the time difference therebetween (step S94). The measured time difference between the reference horizontal synchronization signal and the target horizontal synchronization signal is compared to the empirically predetermined desired time difference which yields the proper alignment in process direction 54 of the reference lines of toner and the target lines of toner on transfer belt 36. More particularly, in step S96 it is determined whether the measured time difference is within an empirically predetermined desired range or set of limits which yields the proper alignment.

If the measured time difference is within the desired limits, then no action is required to maintain proper alignment (step 97). If, however, the measured time difference is outside of the desired limits, then one period of the alternate clock is used as the REFCLKT clock signal, as shown in period A in FIG. 9. After the one period of the alternate clock, the REFCLKT clock signal then reverts back to the primary clock period (step 98), as shown in the second time interval P in FIG. 9.

The temporary change in frequency of the REFCLKT clock signal results in a corresponding temporary change in speed in both target motor 106 and target polygon 52. This temporary change in speed of the rotation of target polygon 52 creates a shift in the phase difference between reference polygon 46 and target polygon 52. This shift in the phase difference is maintained after the speed of target polygon 52 is again substantially equal to that of reference polygon 46, i.e., after the REFCLKT clock signal reverts back to the primary clock period. In the embodiment shown in FIG. 9, the period of the alternate clock is longer than that of the primary clock. Since the speed of target motor 106, and the speed of target polygon 52, is proportional to the frequency of clock signal REFCLKT, the speed of target polygon 52 temporarily decreases during period A. Of course, if the period of the alternate clock were shorter than that of the primary clock, then the speed of target polygon 52 would be temporarily increased. Regardless of whether the speed of target polygon 52 is temporarily decreased or increased, the phase difference between the rotation of reference polygon 46 and the rotation of target polygon 52 is thereby shifted or "tweaked".

After a sufficient waiting interval during which the speed of target polygon 52 stabilizes (step S100), the time difference between the reference horizontal synchronization signal and the target horizontal synchronization signal is again measured (step S94) and compared to the empirically predetermined desired limits (step S96). The above-described process continues until the measured time difference is within the predetermined limits, thereby resulting in the proper alignment in process direction 54 of the reference lines of toner and the target lines of toner on transfer belt 36.

Even after the proper alignment has been achieved as described above, monitoring of the time difference between the reference horizontal synchronization signal and the target horizontal synchronization signal can continue to ensure that the time difference remains within the desired limits. It is possible for this further monitoring to be performed continuously, or performed at certain sampling intervals.

The periods of both the primary clock and the alternate clock are adjustable. Setting the period of the alternate clock to be much different from the period of the primary clock causes relatively large shifts in phase between the reference horizontal synchronization signal and the target horizontal synchronization signal. Conversely, if the period of the alternate clock is very close to the period of the primary clock, there will be relatively small changes in phase between the reference horizontal synchronization signal and the target horizontal synchronization signal.

The period of the alternate clock must be selected with care to gain the desired phase accuracy, avoid falling out of lock, and to minimize the time spent adjusting the phase. It has been found that it is easily possible to obtain an accuracy of between 1/80 and 1/10 of a scan depending upon the time allotted to making adjustments. It is also possible, in another embodiment, to start with an alternate clock period differing substantially from the period of the primary clock to make gross phase adjustments, and then to switch to an alternate clock period differing only slightly from the primary clock period to make fine phase adjustments.

In a preferred phase adjustment method, assume that it is necessary to alter the phase of eight-faceted rotating polygon mirror 52 in the time it takes to complete eight revolutions, and that the speed of motor 106 is 19,500 revolutions per minute (RPM). The time required to complete eight revolutions (64 facets) can be determined to be 24.615 ms (8 revolutions/19,500 RPM). This adjustment period of 24.615 ms is the time allotted for changing from one relative phase between polygon mirrors to another relative phase. Also assume that the reference clock frequency in Hertz is equal to the motor frequency in RPM divided by ten. Thus, the steady state reference clock frequency is 1950 Hz.

Figure 10:
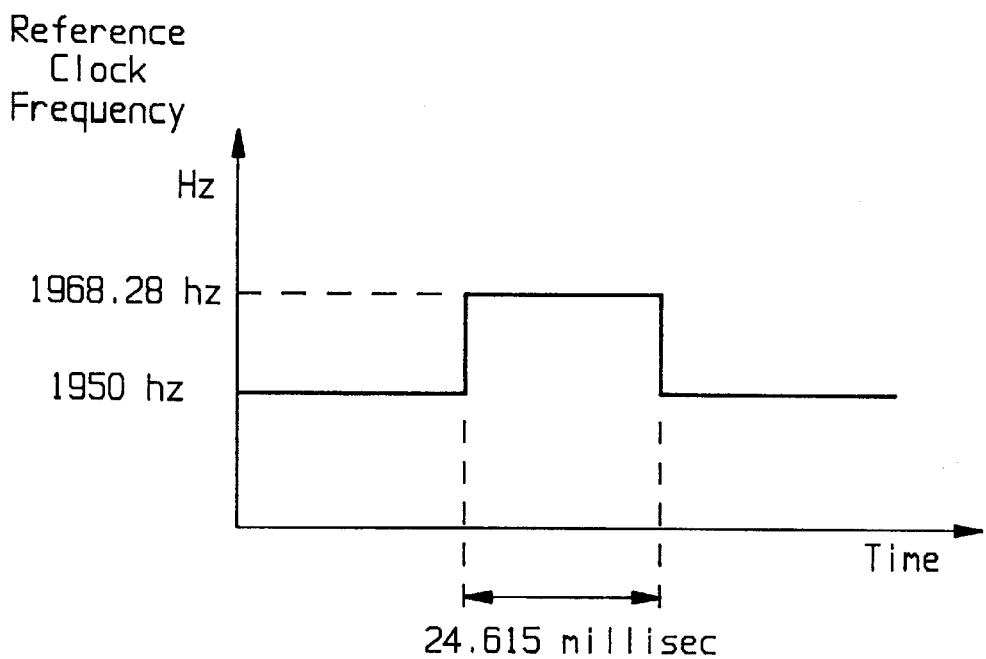
FIG. 10 is a timing diagram of another signal generated by the engine controller of FIG. 1.

In the case where the motor speed during the adjust period needs to be increased, i.e., the relative phase between the reference polygon mirror and the adjusted polygon mirror needs to be increased by, for example, 0.6 scans, the adjust reference clock frequency is set to (64.6/64)×1950 Hz=1968.28 Hz. This adjust frequency reference clock is applied for the adjustment time period of 24.615 ms, as indicated in FIG. 10.

Figure 11:
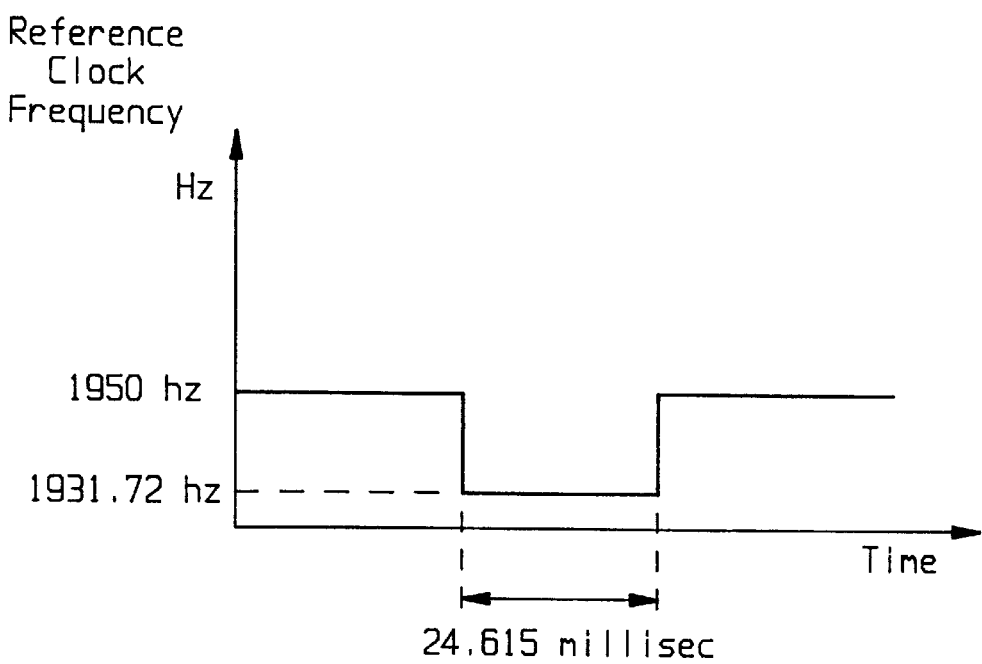
FIG. 11 is a timing diagram of yet another signal generated by the engine controller of FIG. 1.

In the case where the motor speed during the adjust period needs to be decreased, i.e., the relative phase between the reference polygon mirror and the adjusted polygon mirror needs to be decreased by, for example, 0.6 scans, the adjust reference clock frequency is set to (63.4/64)×1950 Hz=1931.72 Hz. This adjust frequency reference clock is also applied for the adjustment time period of 24.615 ms, as indicated in FIG. 11.

The above-described methods allow the user to make almost perfect alignment. The transient reference clock frequency is not significantly different from the steady state frequency, reducing the chances of breaking lock.

If the application requires that Video be active and HSYNCs are reliably generated while the phasing process occurs, then it may be desirable to use the decreased speed method described above rather than the increased speed method. The advantage of the decreased speed method stems from the fact that the user must make sure Video is driven low so that HSYNCs are not lost and scan lines are written on the drum.

The method of the present invention has been described herein as being used in conjunction with a laser printer. However, it is to be understood that the method of the present invention can be used with any type of electrophotographic machine.

While this invention has been described as having a preferred design, the present invention can be further modified within the spirit and scope of this disclosure. This application is therefore intended to cover any variations, uses, or adaptions of the invention using its general principles. Further, this application is intended to cover such departures from the present disclosure as come within known or customary practice in the art to which this invention pertains and which falls within the limits of the appended claims.

What is claimed is:

1. A method of aligning print images of an electrophotographic machine on a print medium, said method comprising the steps of:

providing a first rotating photoconductive drum and a second rotating photoconductive drum in the electrophotographic machine;

reflecting a first laser beam off of a first rotating reflector to thereby scan said first laser beam across said first photoconductive drum to produce a first scan line in a scan direction;

cyclically repeating said rotation of said first reflector to thereby produce a plurality of substantially parallel said first scan lines on said first photoconductive drum;

applying a respective line of first toner to each of said first scan lines;

reflecting a second laser beam off of a second rotating reflector to thereby scan said second laser beam across said second photoconductive drum to produce a second scan line in the scan direction;

cyclically repeating said rotation of said second reflector to thereby produce a plurality of substantially parallel said second scan lines on said second photoconductive drum;

applying a respective line of second toner to each of said second scan lines;

providing a moving toner transfer medium contacting each of said first photoconductive drum and said second photoconductive drum;

transferring each said line of first toner from said first photoconductive drum to said toner transfer medium;

transferring each said line of second toner from said second photoconductive drum to said toner transfer medium such that said lines of second toner are substantially interspersed with said lines of first toner on said toner transfer medium;

transferring said lines of first toner and said lines of second toner from said toner transfer medium to the print medium; and temporarily changing a speed of said rotation of at least one of said first reflector and said second reflector to thereby achieve a desired phase difference therebetween, said desired phase difference being such that at least one said line of first toner is substantially aligned in a process direction with a corresponding said line of second toner on said toner transfer medium, the process direction being substantially perpendicular to the scan direction.

2. The method of claim 1, comprising the further step of determining an actual phase difference between said rotation of said first reflector and said rotation of said second reflector, said step of temporarily changing said speed of said rotation being dependent upon said actual phase difference.

3. The method of claim 2, wherein said first laser beam impinges upon a first point on said first reflector at a beginning of each said first scan line, said second laser beam impinging upon a second point on said second reflector at a beginning of each said second scan line.

4. The method of claim 3, wherein said step of temporarily changing said speed of said rotation results in a shift of at least one of:
a first time at which said first laser beam impinges upon said first point on said first reflector; and
a second time at which said second laser beam impinges upon said second point on said second reflector.

5. The method of claim 4, wherein said step of determining an actual phase difference includes ascertaining a time difference between said first time and said second time.

6. The method of claim 1, comprising the further steps of:
providing a first motor and a second motor for rotating said first reflector and said second reflector, respectively; and
providing a first cyclical signal and a second cyclical signal for driving said first motor and said second motor, respectively, a speed of said first motor being dependent upon a frequency of said first cyclical signal, a speed of said second motor being dependent upon a frequency of said second cyclical signal, said step of temporarily changing said speed of said rotation including changing a time duration of at least one cycle of at least one of said first cyclical signal and said second cyclical signal.

7. The method of claim 1, wherein said desired phase difference is such that a plurality of said lines of first toner are each aligned in the process direction with a corresponding said line of second toner on said toner transfer medium.

8. The method of claim 1, wherein at least one of said first reflector and said second reflector comprises a polygon mirror.

9. The method of claim 1, wherein said step of temporarily changing said speed of said rotation comprises one of temporarily increasing and temporarily decreasing said speed of said rotation.

10. A method of aligning print images of an electrophotographic machine on a print medium, said method comprising the steps of:

providing a first rotating photoconductive drum and a second rotating photoconductive drum in the electrophotographic machine, each said drum having a substantially equal surface speed;

scanning a first laser beam across said first photoconductive drum to produce a first scan line in a scan direction;

cyclically repeating said scanning of said first laser beam in a plurality of first scan cycles to thereby produce a plurality of substantially parallel said first scan lines on said first photoconductive drum, a first time duration of each said first scan cycle being a substantially equal and constant first scan cycle time period;

applying a respective line of first toner to each of said first scan lines;

scanning a second laser beam across said second photoconductive drum to produce a second scan line in the scan direction;

cyclically repeating said scanning of said second laser beam in a plurality of second scan cycles to thereby produce a plurality of substantially parallel said second scan lines on said second photoconductive drum, a second time duration of each said second scan cycle being substantially equal to said first time duration;

applying a respective line of second toner to each of said second scan lines;

providing a toner transfer medium contacting each said photoconductive drum at a respective toner transfer nip, said toner transfer medium having a surface speed substantially equal to said surface speed of each of said photoconductive drums;

adjusting a plurality of times at which said second laser beam starts respective said second scan lines to thereby achieve a desired time difference between a first point in time when said first laser beam starts a selected said first scan line and a second point in time when said second laser beam starts a selected said second scan line; said desired time difference being such that at least one said line of first toner is substantially aligned in a process direction with a corresponding said line of second toner on said toner transfer medium, said process direction being substantially perpendicular to said scan direction;

transferring said toner from said photoconductive drums to said toner transfer medium; and transferring said toner from said toner transfer medium to the print medium.

11. The method of claim 10, wherein said scanning steps include reflecting each of said first laser beam and said second laser beam off of a respective reflector, each said reflector rotating relative to said respective laser beam to thereby scan said respective laser beam across a respective one of said photoconductive drums.

12. The method of claim 10, comprising the further step of determining an actual time difference between said first point in time and said second point in time, said adjusting step being dependent upon said actual time difference.

13. The method of claim 12, wherein each said laser beam impinges upon a respective sensor at at least one of a beginning and an end of each said scan line, each said sensor generating a respective sensor signal upon being impinged upon, said step of determining an actual time difference including measuring a time difference between two of said sensor signals.

14. The method of claim 13, wherein said adjusting step changes a time at which said second laser beam impinges upon said respective sensor.

15. The method of claim 10, wherein each of said first scan cycles and said second scan cycles produces a respective said scan line on a respective said photoconductive drum.

16. A method of aligning print images of an electrophotographic machine on a print medium, said method comprising the steps of:
providing a first rotating photoconductive drum and a second rotating photoconductive drum in the electrophotographic machine, each said drum having a substantially equal surface speed;
scanning a first laser beam across said first photoconductive drum to produce a first scan line in a scan direction;
cyclically repeating said scanning of said first laser beam in a plurality of first scan cycles to thereby produce a plurality of substantially parallel said first scan lines on said first photoconductive drum, a first time duration of each said first scan cycle being a substantially equal and constant first scan cycle time period;
applying a respective line of first toner to each of said first scan lines;
scanning a second laser beam across said second photoconductive drum to produce a second scan line in the scan direction;
cyclically repeating said scanning of said second laser beam in a plurality of second scan cycles to thereby produce a plurality of substantially parallel said second scan lines on said second photoconductive drum, a second time duration of each said second scan cycle being substantially equal to said first time duration;
applying a respective line of second toner to each of said second scan lines;
providing a toner transfer medium contacting each said photoconductive drum at a respective toner transfer nip, said toner transfer medium having a surface speed substantially equal to said surface speed of each of said photoconductive drums;
generating a first synchronization signal indicating a plurality of first times at which said first laser beam starts a respective said first scan line;
generating a second synchronization signal indicating a plurality of second times at which said second laser beam starts a respective said second scan line, said second signal being time staggered relative to said first signal such that at least one said line of first toner is substantially aligned in a process direction with a corresponding said line of second toner on said toner transfer medium, said process direction being substantially perpendicular to said scan direction;
modulating said first laser beam during said scanning step and dependent upon said first synchronization signal;
modulating said second laser beam during said scanning step and dependent upon said second synchronization signal;
transferring said toner from said photoconductive drums to said toner transfer medium; and
transferring said toner from said toner transfer medium to the print medium.

17. A method of providing image registration in an electrophotographic printer having a plurality of multifaceted mirrors and a corresponding plurality of developing units having a corresponding plurality of toner transfer nips, said method comprising the steps of:
reflecting a first laser beam off of a first of said mirrors, said first mirror rotating relative to said first laser beam to thereby scan said first laser beam across a first of said developing units to produce a first scan line in a scan direction;
cyclically repeating said relative rotation between said first laser beam and said first mirror to thereby produce a plurality of substantially parallel said first scan lines on said first developing unit;
applying a respective line of first toner to each of said first scan lines;
reflecting a second laser beam off of a second of said mirrors, said second mirror rotating relative to said second laser beam to thereby scan said second laser beam across a second of said developing units to produce a second scan line in the scan direction;
cyclically repeating said relative rotation between said second laser beam and said second mirror to thereby produce a plurality of substantially parallel said second scan lines on said second developing unit;
applying a respective line of second toner to each of said second scan lines;
providing a moving toner transfer medium contacting each of said first developing unit and said second developing unit at a respective said toner transfer nip;
transferring each said line of first toner from said first photoconductive drum to said toner transfer medium;
transferring each said line of second toner from said second photoconductive drum to said toner transfer medium such that said lines of second toner are substantially interspersed with said lines of first toner on said toner transfer medium; and
providing a rotational offset of said second mirror relative to said first mirror, said rotational offset being such that at least one said line of first toner is substantially aligned in a process direction with a corresponding said line of second toner on said toner transfer medium, the process direction being substantially perpendicular to the scan direction.

18. The method of claim 17, wherein said rotational offset is substantially proportional to a desired phase difference between said rotation of said first mirror and said rotation of said second mirror.

19. The method of claim 17, wherein said rotational offset comprises a difference in respective rotational positions of said first mirror and said second mirror.

20. The method of claim 17, wherein said rotational offset is maintained substantially throughout said cyclically repeating steps.

21. A method of controlling the relative phase between a first laser scanner having a first polygonal mirror rotatably coupled to a first motor and a second laser scanner having a second polygonal mirror rotatably coupled to a second motor in an electrophotographic machine, comprising the steps of:
setting a desired range of a phase difference between said first laser scanner and said second laser scanner;
generating a first cyclical speed control signal for controlling a rotational velocity of said first laser scanner;
generating a second cyclical speed control signal for controlling a rotational velocity of said second laser scanner;

verifying that each of said first motor and said second motor is operating at a respective desired speed;

measuring an actual phase difference between said first laser scanner and said second laser scanner;

ascertaining whether said actual phase difference is within said desired range;

if said actual phase difference is within said desired range, taking no action; and if said actual phase difference is not within said desired range:

changing a time duration of at least one cycle of at least one of said first cyclical speed control signal and said second cyclical speed control signal to thereby temporarily change a speed of rotation of at least one of said first polygonal mirror and said second polygonal mirror; and repeating said measuring, ascertaining and changing steps until said actual phase difference is within said desired range.

22. The method of claim 21, wherein said setting step includes setting a desired range of a phase difference between a rotation of said first polygonal mirror and a rotation of said second polygonal mirror.

23. The method of claim 21, wherein a speed of said first motor is dependent upon a first frequency of said first cyclical speed control signal, a speed of said second motor being dependent upon a second frequency of said second cyclical speed control signal, said first frequency being substantially equal to said second frequency.

24. The method of claim 21, comprising the further steps of:

reflecting a first laser beam off of said first polygonal mirror to thereby scan said first laser beam across a first photoconductive drum to produce a first scan line in a scan direction;

cyclically repeating said rotation of said first polygonal mirror to thereby produce a plurality of substantially parallel said first scan lines on said first photoconductive drum;

applying a respective line of first toner to each of said first scan lines;

reflecting a second laser beam off of said second polygonal mirror reflector to thereby scan said second laser beam across a second photoconductive drum to produce a second scan line in the scan direction;

cyclically repeating said rotation of said second polygonal mirror to thereby produce a plurality of substantially parallel said second scan lines on said second photoconductive drum;

applying a respective line of second toner to each of said second scan lines;

transferring each said line of first toner from said first photoconductive drum to a moving toner transfer medium; and transferring each said line of second toner from said second photoconductive drum to said toner transfer medium such that said lines of second toner are substantially interspersed with said lines of first toner on said toner transfer medium;

wherein said desired range of said phase difference is such that at least one said line of first toner is substantially aligned in a process direction with a corresponding said line of second toner on said toner transfer medium, the process direction being substantially perpendicular to the scan direction.

* * * * *